April 1, 1924. 1,489,130
L. KOROPP ET AL
PROCESS OF TREATING NATURAL PLANTS
Filed Aug. 2, 1919
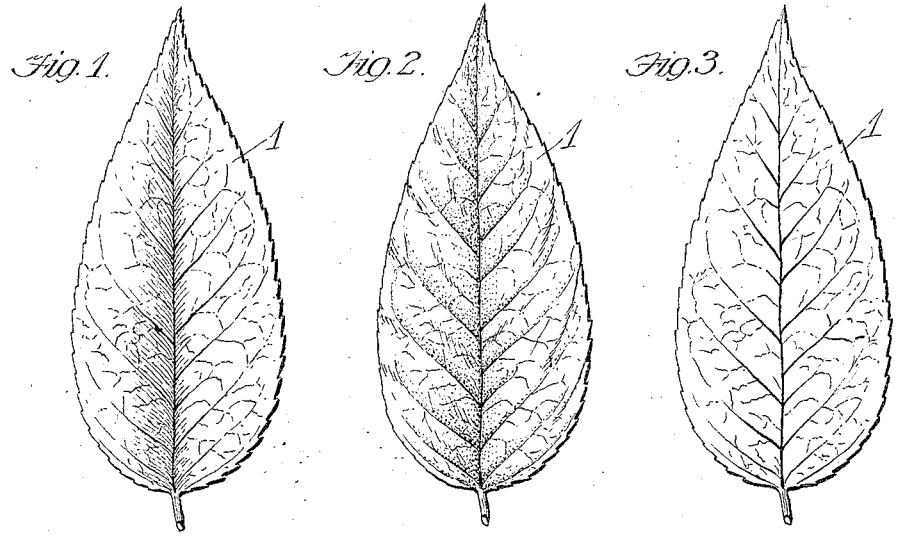
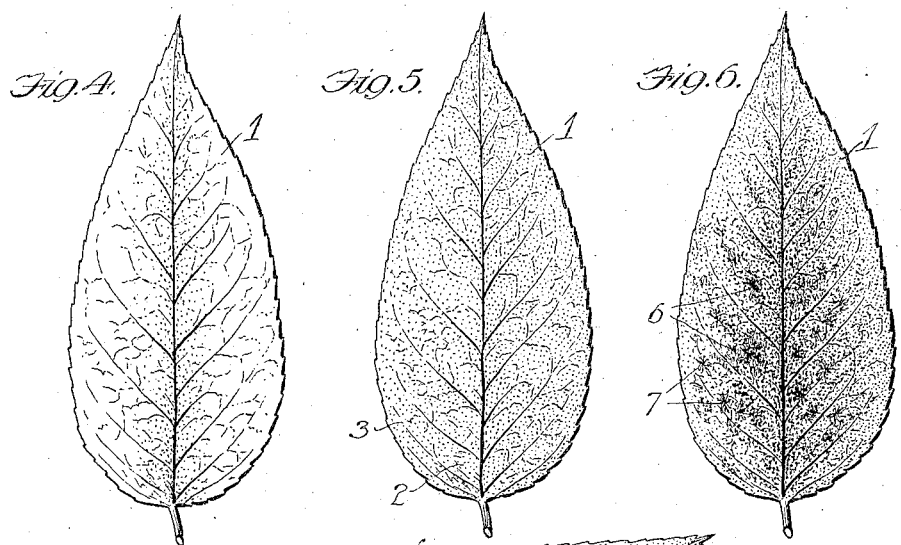
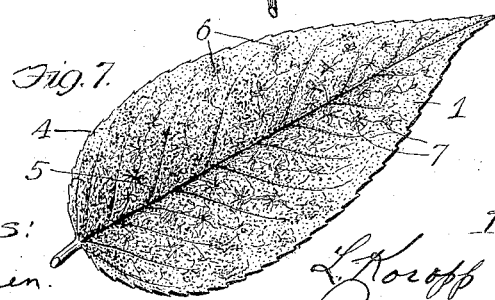

Patented Apr. 1, 1924.

1,489,130

UNITED STATES PATENT OFFICE.

LEOPOLD KOROPP AND VICTOR F. BERGMAN, OF CHICAGO, ILLINOIS.

PROCESS OF TREATING NATURAL PLANTS.

Application filed August 2, 1919. Serial No. 314,813.

*To all whom it may concern:*

Be it known that we, LEOPOLD KOROPP and VICTOR F. BERGMAN, citizens of the United States of America, and residents of Chicago, county of Cook, and State of Illinois, have invented certain new and useful Improvements in Processes of Treating Natural Plants, of which the following is a specification.

This invention relates to methods of preserving vegetable growths or plants in as nearly a natural state as possible, and to methods of coloring same to produce artistic and decorative effects. The product of this invention is covered by our copending application Serial No. 314,812 of even date herewith. The solution hereinafter referred to is covered by our copending application Serial No. 312,064 also of even date herewith.

The main objects of the invention are to treat various kinds of plants or parts thereof in such manner as to preserve their natural appearance in shape and flexibility, and to retain also in some instances their natural coloring, as for instance grasses, weeds, herbs, leaves, seed pods, et cetera; to so treat such plants for some purposes, with pigments and preservatives such as will emphasize and magnify their decorative appearance, and insure retention of the original character and appearance of the finished product indefinitely; and to provide against deteriorative effects from moisture, mould, fungi, ferments, or other growths.

An illustrative embodiment of this invention is shown in the accompanying drawings, in which—

Fig. 1 represents a leaf in its natural growing condition.

Fig. 2 represents said leaf after it has been dried in its natural shape and becomes somewhat wrinkled thereby.

Fig. 3 represents said leaf after it has been soaked in softening and preserving solution.

Fig. 4 represents said leaf after it has again been dried to a greater or less extent.

Fig. 5 represents said leaf after it has been sprayed with a flat coloring material, as paint, disposed rather thin in places.

Fig. 6 is a view of said leaf after it has been sprinkled, while the paint is still wet and sticky, with colored pigment in the form of dust, chips, bronze powder, floss, or the like instead of spray.

Fig. 7 is a view of the leaf of Fig. 4 after treatment with different colored sprays to produce a mixed or variegated coloring, and also sprinkled in places with dust, chips and floss.

The plant or natural growth to be treated is gathered or harvested in whatever stage of its development may be desired for preservation. It is to be understood, however, that the more advanced and matured specimens are preferable for general decorative purposes, owing to their greater natural beauty and adaptability to retain their original form, though for some purposes greater flexibility is desirable, in which case young growing plants are preferable.

The plants are first dried, preferably as soon as possible after gathering. If necessary, they may be kept in this condition for a time, but it is preferable to treat them soon with a softening and preserving composition. For this purpose we prefer the solution described in our said application Serial No. 312,064 the essential components being glycerine, water and formalin in the proportion preferably of ten, eighty-nine and one respectively.

The dried plant or part, which is usually stiff and hard, is soaked in this fluid until the pores and cells have all become saturated with the solvent, glycerine, and the accompanying preservative, formalin. The glycerine somewhat softens the texture of the fibers, especially if the plant was young and growing when gathered, and so renders it pliable. The formalin enters the pores with the glycerine and so permeates the whole plant and renders it antiseptic and decay proof.

Long fiber materials, such as ripening grains, grasses and the like, do not require so much soaking as fine texture materials, such as leaves, flowers, et cetera; ten hours being about right for the former and fourteen to sixteen hours for the latter. The more solid materials, such as hard stems and dead weeds of some kinds, require about twenty-four hours.

The material treated is placed in such manner as to drain off the surplus liquid after sufficient soaking, and is also permitted to dry off on the surface, ready for the next step.

The primary function of the glycerine is to soften the texture of the dried leaf or other object, and to restore the same to its natural, soft or flexible state, capable of withstanding jars, bending, crumpling and the like. Being transparent it has little or no effect on the natural coloring of the plant. The natural gums and resins are presumably all dissolved by the glycerine and so caused to become substantially an integral part of the solution. This permits the glycerine and formalin to penetrate every pore of vegetable tissue.

The function of the powerfully antiseptic formalin is to preserve the structure of the plant from decay and from insects, et cetera.

When the foregoing fluid composition is properly used in the process of treating the objects to be preserved, said object retains substantially all of its natural physical attributes respecting form, color, pliability, and resilience, so that it is especially adapted to serve either as a botanical specimen, for educational purposes, or as an article of decorative character, whether additional coloring or decorative features be added or not. Generally the addition of such features is desirable, as will be more fully set forth.

Referring further to the product illustrated by said drawings, Figs. 1 to 7, the leaf 1, following the foregoing preliminary treatment, may have the first coloring matter, preferably a flat oil-paint, so applied as to give either a solid uniform appearance or preferably a shaded thick and thin appearance, as indicated at 2 and 3. Moreover, a plurality of blending shades or colors merging one into the another may be applied, ranging from a light color, indicated at 4, to a darker color, indicated at 5. This much of the treatment is basic and applies to all plants including leaves, grasses, mosses, ferns and such flowers as are capable of preservation by the means herein set forth, though in most such cases the flat colors are arranged for solid effect. Generally the oil colors are far better adapted for plant decoration than anilines or water colors.

If further treatment is to be accorded, a coating of varnish is applied which serves both to protect the flat colors and also give lustre thereto, and to retain the moisture and subsequently applied materials. Brilliant spotted or local effects may be produced by applying powdered pigment, either in spots as shown at 6, or, if preferred, the pigment may be distributed somewhat uniformly or in zones to suit the fancy of the decorator. Still more delicate effects may be produced by means of applying fibrous material such as floss, flock or the like as indicated at 7, so as to produce a delicate fuzzy or hairy appearance such as occurs naturally on some leaves, especially on the under side. Chips, granules, crystals and crumbs of various character may also be applied, as will be apparent, in place of or in conjunction with the powder 6.

We find that all liquid coloring may as a rule be applied best by means of a spray brush, though some of the plain and coarser growths may be dipped directly into a thin paint. In the latter case, the excess paint may be drained off by suspending the plant over a suitable drip-pan as will be understood. Delicate branchy plants, however, cannot be dipped, as the parts would mop together, spraying being necessary.

The dust-pigments, chips, floss and the like may well be dusted on by means of a pepper-shaker or such means, or in some instances a pneumatic fan "gun" may be used to blow on the powders, et cetera.

Some of the granular coloring materials which may be used with good effect are particles of metal such as chips or filings and the like, oxides of metal, diamond dust, slag and natural sands, some of which latter occur naturally in strata of variegated colors.

Various other kinds of comminuted solid coloring materials may also be used by shaking same upon the adhesive coating, as for instance, starch, flour, meal and certain kinds of flock and floss. Some of the flosses serve well to produce desirable flocculent effects. Certain solid pigments may be more or less soluble in the wet adhesive and may accordingly run somewhat therein, as for instance some of the amorphous powders and oxides.

There is great utility of this invention in the decorative art, especially for store window and general interior decorations, stage scenery, landscape and garden effects, and in the field of millinery design. The product is not only cheap and easy to produce, but is durable and adapted for most rich and pleasing effects, and is moreover far truer to the natural beauties of nature than any artificial decorations can be.

It is to be understood the spirit of this invention is defined by the following claim.

We claim:

The method of treating natural plants for preserving and decorating same, which consists in drying the plant or any required part thereof, treating same with a softening and preserving solution, drying same, applying a thin coating spray of adhesive material thereto and then, while the adhesive is still wet, sprinkling on a solid material adapted to produce whatever corresponding artistic effect may be desired.

Signed at Chicago, this 12th day of July, 1919.

LEOPOLD KOROPP.
VICTOR F. BERGMAN.

Certificate of Correction.

It is hereby certified that in Letters Patent No. 1,489,130, granted April 1, 1924, upon the application of Leopold Koropp and Victor F. Bergman, of Chicago, Illinois, for an improvement in " Processes of Treating Natural Plants," errors appear in the printed specification requiring correction as follows: Page 2, line 107, after the word " understood " insert the words *that some of the details of the process and product set forth may be altered or omitted without departing from;* same page, line 115, in claim, strike out the word " spray "; and that the said Letters Patent should be read with these corrections therein that the same may conform to the record of the case in the Patent Office.

Signed and sealed this 6th day of May, A. D. 1924.

[SEAL.] KARL FENNING,
*Acting Commissioner of Patents.*